March 10, 1970  F. A. DAHLMAN ET AL  3,499,747
SPLIT MOLD OPERATING AND CLAMPING APPARATUS
Filed April 11, 1967  2 Sheets-Sheet 2

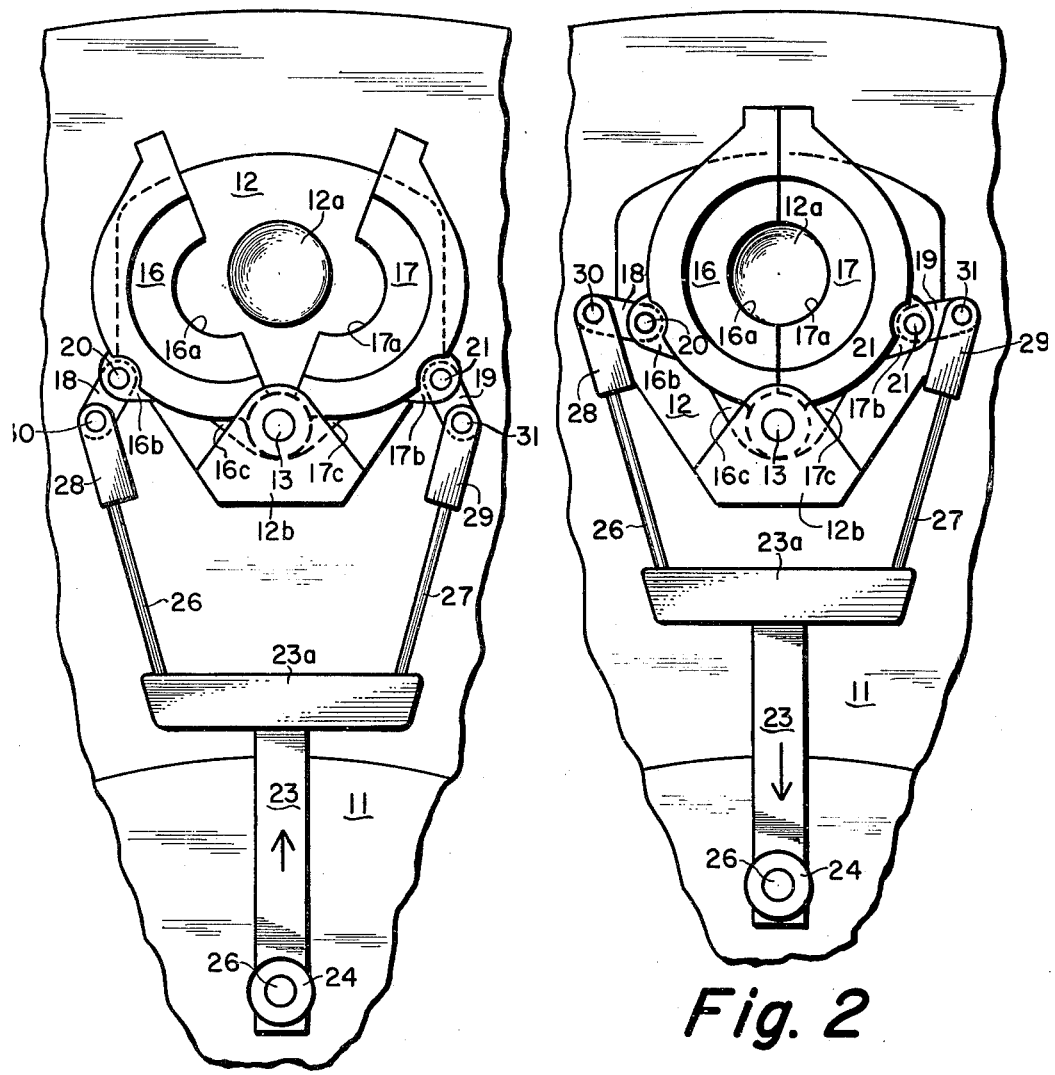

INVENTORS.
FREDERICK A. DAHLMAN
JOHN J. SCHOLL
BY

Charles W. Gregg
AGENT

ABSTRACT OF THE DISCLOSURE
An apparatus including elongate spring members of an elastic and resilient material, such as rods, strips, or leaves of such material, is linked to mold halves or sections of a split mold to actuate such halves about a common pivot pin or pintle between open and closed positions. In the closed position of the mold halves such halves are clamped closed by forces acting substantially directly opposite to each other, such forces being exerted by the elasticity of the spring members.

BACKGROUND OF THE INVENTION

This invention relates to the field of glass forming and particularly to glass forming machinery employing operable split glass molds for the press forming of glass articles from charges of molten glass supplied to a mold cavity formed by the mold halves or sections of the split mold when such halves are in their closed positions. More specifically the invention relates to an apparatus or assembly for operating glass forming split mold halves between their open and closed positions, and for clamping the mold halves in their closed position during charging of a mold cavity formed by such mold halves in such position and during subsequent transfer of such mold halves.

There is shown, for example, in Letters Patent of the United States No. 879,294, issued Feb. 18, 1908, to William J. Miller and entitled Mold, a split mold comprising mold halves A to which is secured sections D and D' of a hinge, and such hinge sections being affixed to the mold halves including a pintle $D^2$ about which such sections pivot to open and close the mold halves. Arms C' of a rigid yoke C are pivotally connected to one end of connecting links B, the other ends of such links being pivotally connected to the mold halves. Yoke C actuates mold halves A to their closed positions and compression coil springs F provide additional forces resiliently urging such yoke to its position shown in FIG. 1 of the drawings of the patent. Components of such additional forces cause clamping of the hold halves in their closed positions.

In the apparatus of the Miller patent, the forces exerted by springs F, when mold halves A are in their closed positions, each have two components one of the components of each such force causing clamping of the mold halves, as previously mentioned. However, the substantially larger component of each such force acts between pintle $D^2$ and the cam lever or other device which operates on roller G to close mold halves A. Such larger components of the forces exerted by springs F tend, therefore, to cause tilting of pintle $D^2$ and resulting tilting or deflection of mold halves A from about the true center axis of the mold cavity normally formed by the closed mold halves. As is obvious, such deflection of mold halves A is detrimental to the glass pressing performance of the apparatus and defective ware can result therefrom. Accordingly, the apparatus of the present invention was developed to overcome the specifically described disadvantage of the apparatus of the Miller patent, as well as additional disadvantages of the apparatuses of the patent and other prior art apparatuses.

SUMMARY OF THE INVENTION

In producing the present invention the mold halves or sections of a split mold are supported by a common pivot pin or pintle for opening and closing of such mold halves along a diametrical line of the mold cavity formed by such halves in their closed position, and elongate elastic and resilient spring member assemblies embodying forms of leaf springs, are connected through linkages to the mold halves for operating such halves between the open and closed positions of the mold. In the closed position of the mold, the mold halves are clamped closed by the elasticity of the springs of said assemblies, such elasticity imparting forces to the mold halves substantially perpendicular or normal to said diametrical line of the mold cavity, that is, forces acting almost entirely directly opposite to each other.

BRIEF DESCRIPTION OF THE DRAWINGS

In the drawings, FIG. 1 is a top plan view of the apparatus embodying the invention and illustrating the mold halves of the split mold of the apparatus in their open positions;

FIG. 2 is a view similar to FIG. 1 and illustrating the mold halves of the split mold of the apparatus in their closed positions;

Similar reference characters refer to similar parts in each of the figures of the drawings.

DESCRIPTION OF THE PREFERRED EMBODIMENTS

Figure 3:
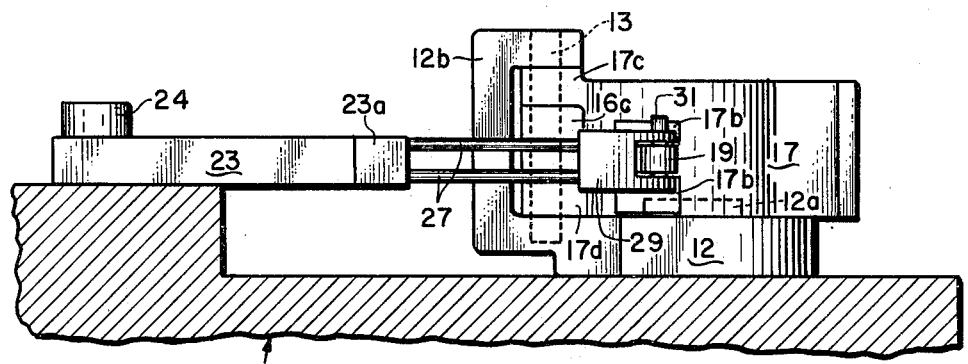
FIG. 3 is a side elevational view of the apparatus of FIGS. 1 and 2, and also illustrates the mold halves of the split mold of the apparatus in their closed positions.

Referring to FIGS. 1, 2 and 3 of the drawings in detail, there is shown a portion of a rotatable platform 11 of a glass press-forming machine of a type well known in the art, such portion being one adjacent the outer perimeter of the platform as will be readily apparent to those skilled in the art. A mold base 12 is disposed on and secured, in any convenient manner, to the top surface of platform 11 adjacent the outer periphery of such platform. Mold base 12 includes an upwardly projecting circular disk-like portion 12a which forms the bottom of the glass forming mold of the apparatus of the invention, as hereinafter further discussed. Mold base 12 further includes a sturdy upright clevis-like portion 12b including a pivot pin or pintle 13 extending vertically therethrough and having its bottom end extending into and secured in a suitable and cooperative hole provided in base 12.

The glass forming mold of the apparatus includes the previously mentioned disk-like portion 12a of mold base 12 and a pair of mold halves 16 and 17 having semicircular channels 16a and 17a, respectively, extending vertically through each respective mold half, each such channel having a radius corresponding to that of the outer periphery of said portion 12a of mold base 12. In the closed position of the mold halves, the bottom portions of said channels closely surround the outer periphery of portion 12a of mold base 12 and meet to form a circularly cylindrical mold cavity the bottom end of which is closed by such portion of mold base 12. This is readily apparent from a brief glance at the drawings.

Mold half 16 includes an outwardly extending hinge portion 16c through which previously mentioned pivot pin or pintle 13 extends. Mold half 17 includes upper and lower outwardly extending hinge portions 17c and 17d, respectively, (FIGS. 3 and 4) through which pivot pin or pintle 13 also extends. Such hinge portions closely surround pintle 13 but are rotatable on and about the pintle for actuating mold halves 16 and 17 between their open and closed positions. Mold half 16 further includes upper and lower lugs, such as 16b, (FIGS. 1 and 2) which project outwardly from the outer periphery of mold half 16. Similarly, mold half 17 further includes upper and lower lugs, such as 17b, which project outwardly from the outer periphery of mold half 17. A first end of a link or link member 18 extends into the space between the lugs, such as 16b, on mold half 16 and is pivotally connected with such lugs by a pivot pin 20 extending vertically through the lugs and said first end of link 18 (FIGS. 1 and 2). Similarly, a first end of a link or link member 19 extends into the space between the lugs, such as 17b, on mold half 17 and is pivotally connected with such lugs by a pivot pin 21 extending vertically through the lugs and said first end of link 19 (FIGS. 1 and 2).

Referring to FIG. 3 taken in conjunction with FIGS. 1 and 2 of the drawings, there is shown upper and lower rods, such as 27, first ends of which are secured in any convenient manner to a first end of a clevis-like or forked member 29 which second or forked end is pivotally connected by a pivot pin 31 to the second end of previously mentioned link or link member 19. Similarly, the first ends of a similar pair of rods, such 26, are secured in any convenient manner to a first end of a clevis-like or forked member 28 which second or forked end is pivotally connected by a pivot pin 30 (FIGS. 1 and 2) to the second end of previously mentioned link or link member 18. It is pointed out that, for purposes of simplification of the drawings, only one of the rods, such as 26, is shown in the drawings. The arrangement of the rods, such as 26, will be readily apparent to those skilled in the art and from a brief glance at the arrangement of the rods, such as 27, as shown in FIG. 3. In the light of the above description it may be said that the first ends of the rods, such as 26 and 27, are pivotally connected with the second ends of links or link members 18 and 19, respectively. Alternatively, the first ends of the rods could be arranged to be directly pivotally connected with their respectively associated links 18 and 19. Under such conditions forked members 28 and 29 would be dispensed with. The rods such as 26 and 27 are made of an elastic and resilient material such as spring steel. In the form of the invention illustrated in FIG. 3, the rods such as 26 and 27 and their associated parts comprise the previously mentioned elongate spring member assemblies.

It is believed expedient to point out at this point in the description that the meanings of the terms, "elastic" and "elasticity," and "resilient" and "resiliency," as employed herein are the technical meanings of such terms. That is, the terms, "elastic" and "elasticity," are intended to refer to that property of a structure or material which causes it to resist, up to a certain point, deformation by a deforming force or forces applied to such structure or a structure made of such material, while the terms "resilient" and "resiliency" are intended to refer to that property of a structure or material which causes it to recover shape quickly after the removal of the deforming force or forces applied to such structure or a structure made of such material.

Means are provided for imparting corresponding reciprocative motions to the rods such as 26 and 27, such motions being in linear paths extending parallel to the previously mentioned diametrical line of the mold cavity formed by the mold halves when in the closed position of the mold. Such reciprocative motions imparted to said rods actuate the mold halves to their open and closed positions as hereinafter described in detail. The means for supplying or imparting said motions to said rods is shown in the drawings as comprising a T-shaped assembly 23 including a cross-bar portion 23a. However, the reciprocative motion imparting means may be any of many known forms of such apparatus, such means, per se, forming no part of the present invention and the T assembly shown being merely illustrative of one type of such motion imparting means.

Figure 4:
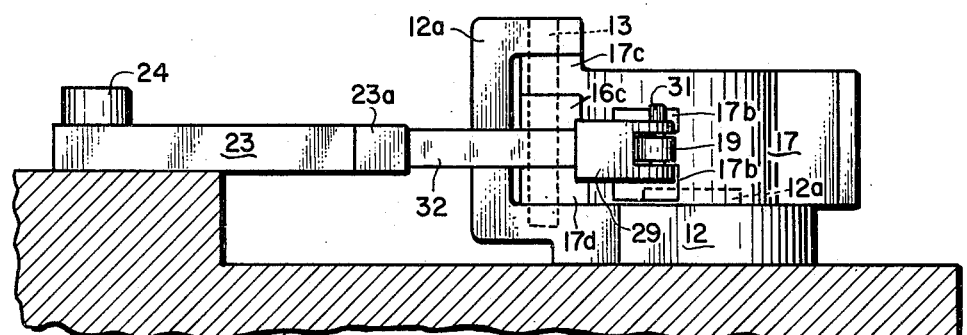
FIG. 4 is a view similar to FIG. 3 and illustrating an alternative form of the apparatus embodying the invention.

The bottom surface of the main portion of the T assembly 23 is shown resting on the top surface of a raised portion of platform 11 (FIGS. 3 and 4). A roller or cam follower 24 is pivotally attached by a pivot pin 26 to the top surface of the main portion of the T assembly adjacent the single end of such main portion. T assembly 23 may be moved between the positions shown in FIGS. 1 and 2 of the drawings, by cam tracks which contact roller or cam follower 24 during rotation of platform 11. Alternatively, T assembly 23 can be moved between said positions by suitable motor means, such as pressurized fluid actuated pistons and associated cylinders, for example, or by a combination of such motor means and cam tracks. However, the specific means for actuating T assembly 23 between said positions also forms, per se, no part of the present invention and, therefore, such means are not shown in the drawings. The various means by which the reciprocative motion imparting means, such as T assembly 23, can be moved are well known to those skilled in the art.

Referring further to FIGS. 1, 2 and 3 of the drawings, the second ends of the rods, such as 27, are shown secured to cross bar 23a of T assembly 23 adjacent the right hand end of such cross bar (viewing FIGS. 1 and 2). Such rods may be so secured to the cross bar in any convenient manner. Similarly, the second ends of the rods, such as 26, are shown secured to cross bar 23a of T assembly 23 adjacent the left hand end of such cross bar (viewing FIGS. 1 and 2). By the arrangement illustrated, it will be apparent that reciprocative motion supplied to the base of T assembly 23 in the directions indicated by the arrows in FIGS. 1 and 2, that is, in a line or path parallel with said diametrical line of the mold cavity formed by the closed mold halves, will cause similar and equal or corresponding motion of the two spring member assemblies.

In the alternative form of the apparatus illustrated in FIG. 4, single wide spring members or single-leaf springs such as 32 are substituted for the previously discussed rods such as 26 and 27. Such single-leaf springs, similarly to said rods, are made of an elastic and resilient material such as spring steel. It is pointed out that the arrangement of the pairs of rods as shown in FIG. 3, or the form of leaf springs shown in FIG. 4, are sufficiently vertically rigid so as to be vertically self-supporting as well as to vertically support each respective clevis-like member 28 and 29, and thereby, prevent any binding of the described pivotal arrangements including pivot pins 30 and 31. The forms of the elongate spring assemblies illustrated in FIGS. 3 and 4 operate in identical manners, and therefore, a single brief operational example of the apparatus of the invention will suffice for an understanding of both of the preferred embodiments of the invention.

Assuming that the apparatus is in the position illustrated in FIG. 1 and that T assembly 23 is moved, in the manner previously discussed, in the direction of the arrow on the base of the T assembly, that is, in a direction towards the top of the drawing, such movement will cause a similar and corresponding movement of the spring assemblies which, in turn, cause corresponding movement of links 18 and 19. Such movements of links 18 and 19 will move mold halves 16 and 17 toward the closed position of such mold halves. Mold halves 16 and 17 meet along the previously mentioned mold cavity dimetrical line prior to links 18 and 19 being moved a distance such that their longitudinal centerlines are normal or perpendicular to said dimetrical line; that is, prior to the center points of pivot pins 30 and 31 being moved into alignment with a line extending through the center points of pivot pins 20 and 21. At such point in the operation of the apparatus, the respective pivotal arrangements provided at said second end of link 18, and including member 28 and pivot pin 30, and at said second end of link 19, and including member 29 and pivot pin 31, are each prepared to act as a toggle joint.

Continued movement of the T assembly causes links 18 and 19 to pivot about pivot pins 20 and 21 causing opposite outward arcuate movements of pivot pins 30 and 31 and corresponding opposite outward movements of members 28 and 29. Such outward movements overcome the elasticity of the spring members of the spring assemblies and such members are flexed in an outward direction. All of such outward movements continue until the center points of pivot pins 30 and 31 are in alignment with a line then extending through the center points of pivot pins 20 and 21. At such time the resiliency of the flexed spring members causes the spring assemblies to exert forces normal or perpendicular to said diametrical line of the mold cavity. Slight further movement of the T assembly moves the apparatus to the positions illustrated in FIG. 2 of the drawings; that is, to positions such that the center points of pivot pins 30 and 31 are slightly beyond said line extending through the center points of pivot pins 20 and 21. During such further movement, the resiliency of the spring members causes such members to move toward their unflexed positions and the elasticity and resiliency of the spring members causes the spring assemblies to clamp the mold halves together with forces directly opposite to each other and substantially normal to said diametrical line of the mold cavity. Such forces being opposite to each other equalize each other, and being substantially normal to said diametrical line do not impart an undesirable tilting force on pintle 13 and a resultant possible deflection of the mold halves as in the apparatus of the previously cited Miller patent. It is pointed out that the links 18 and 19, during their movements from their positions shown in FIG. 1 to their positions shown in FIG. 2, act as the toggles of the previously mentioned toggle joints including, respectively, member 28 and pivot pin 30, and member 29 and pivot pin 31. The elastically and resiliency of the spring members of the spring assemblies provide the forces for the toggle action of said toggle joints.

What is claimed is:

1. In combination with a split mold including first and second cooperating mold halves supported by common pivotal or hinge means for movement of such mold halves thereabout between open and closed positions of the mold, an apparatus comprising:
    (a) first and second similar links having first ends similarly attached by similar first pivotal means to the outer peripheries of said first and second mold halves, respectively, at corresponding locations thereon;
    (b) first and second identical spring assemblies each including at least one elongate elastic and resilient spring member, first ends of such members being correspondingly joined by similar second pivotal means with the second ends of said first and second links, respectively; and
    (c) means reciprocatively movable in alignment with the center of said common pivotal means and correspondingly rigidly connected to said second ends of said spring members for imparting corresponding reciprocative movement thereto for movement of said mold halves between said open and closed positions of said mold, said spring members, during closures of the mold, supplying through said links to said mold halves forces substantially directly opposing each other to maintain the mold in its closed position.

2. Apparatus in accordance with claim 1 and in which said spring members are rods of spring steel.

3. Apparatus in accordance with claim 1 and in which said spring members are leaves of spring steel.

4. An improved operating and clamping apparatus for a split mold including first and second cooperating mold halves supported by a common pivotal or hinge means for movement of such mold halves thereabout between open and closed positions of the mold, such improved apparatus comprising, in combination,
    (a) first and second identical links each having a first end correspondingly pivotally attached by first and second pivot pins to corresponding points on the outer peripheries of said first and second mold halves, respectively;
    (b) a first elongate spring assembly including an elongate spring member of an elastic and resilient material having one of its ends pivotally connected by a third pivot pin to the second end of said first link;
    (c) a second spring assembly similar to said first spring assembly and including an elongate spring member of an elastic and resilient material having one of its ends pivotally connected by a fourth pivot pin to the second end of said second link correspondingly to said connection to said second end of the first link; and
    (d) means reciprocatively movable in alignment with the center of said common pivotal means and correspondingly rigidly connected to said second ends of said spring members for imparting corresponding reciprocative movement thereto for movement of said mold halves between said open and closed positions of said mold, said spring members, during closures of the mold, supplying through said links to said mold halves forces exerted in directions substantially directly opposite each other and normal to the meeting line of the mold halves to maintain the mold in its closed position.

5. Apparatus in accordance with claim 4 and in which said spring members are rods of spring steel.

6. Apparatus in accordance with the claim 4 and in which said spring members are leaves of spring steel.

References Cited

UNITED STATES PATENTS

| | | | |
|---|---|---|---|
| 840,994 | 1/1907 | Croskey | 65—360 XR |
| 1,720,598 | 7/1929 | Hall | 65—360 XR |
| 2,016,374 | 10/1935 | Kinker | 65—360 |
| 2,062,522 | 12/1936 | Miller | 65—360 XR |
| 1,601,836 | 10/1926 | Stenhouse | 65—360 XR |
| 2,111,296 | 3/1938 | O'Neill | 65—360 XR |
| 2,307,563 | 1/1943 | Bridges | 65—360 |
| 2,757,485 | 8/1956 | Fedevich | 65—360 XR |

FRANK W. MIGA, Primary Examiner

U.S. Cl. X.R.

65—357, 359, 360, 361